United States Patent
Yu et al.

(10) Patent No.: US 7,826,943 B2
(45) Date of Patent: Nov. 2, 2010

(54) METHOD AND SYSTEM FOR DIAGNOSING FAULTS IN A PARTICULAR DEVICE WITHIN A FLEET OF DEVICES

(75) Inventors: Lijie Yu, Clifton Park, NY (US); Daniel Joseph Cleary, Schenectady, NY (US); Mark David Osborne, Castleton, NY (US)

(73) Assignee: General Electric Company, Niskayuna, NY (US)

( * ) Notice: Subject to any disclaimer, the term of this patent is extended or adjusted under 35 U.S.C. 154(b) by 883 days.

(21) Appl. No.: 11/695,350

(22) Filed: Apr. 2, 2007

(65) Prior Publication Data

US 2008/0243328 A1    Oct. 2, 2008

(51) Int. Cl.
*G01B 15/00*    (2006.01)
*G06F 19/00*    (2006.01)

(52) U.S. Cl. ............................. 701/29; 701/34; 701/35; 702/182; 702/185

(58) Field of Classification Search .................. 701/29, 701/33, 35, 57, 40; 702/182, 185, 191; 73/112.03; 703/2
See application file for complete search history.

(56) References Cited

U.S. PATENT DOCUMENTS

| 7,031,878 B2 | 4/2006 | Cuddihy et al. |
| 7,441,448 B2 * | 10/2008 | Volponi ................... 73/112.03 |
| 7,457,732 B2 * | 11/2008 | Aragones et al. ................ 703/2 |
| 2004/0088100 A1 * | 5/2004 | Volponi ....................... 701/100 |

OTHER PUBLICATIONS

L. Yu et al., "A Novel Approach to Aircraft Engine Anomaly Detection and Disgnostics," In Proceedings of the IEEE Aerospace Conference, P.E.2004, pp. 3468-3475, Big Sky, Montana.

L. Yu et al., "Fuzzy Model Optimization Using Genetic Algorithm for Aircraft Engine Diagnosis," Proceedings of the 19th FLAIRS,2006, American Association for Artificial Intelligence, Melbourne, Florida, pp. 1-6.

* cited by examiner

*Primary Examiner*—Tan Q Nguyen
(74) *Attorney, Agent, or Firm*—Richard A. DeCristofaro

(57) ABSTRACT

A method for diagnosing faults in a particular device within a fleet of devices is provided. The method comprises receiving performance data related to one or more parameters associated with a fleet of devices and processing the performance data to detect one or more trend shifts in the one or more parameters. The method then comprises detrending the one or more parameters to derive noise-adjusted performance data related to a particular parameter associated with a particular device. The method further comprises generating a fleet-based diagnostic model based on trend patterns and data characteristics associated with the fleet of devices. The fleet-based diagnostic model comprises one or more fuzzy rules defining one or more expected trend shift data ranges for the one or more parameters associated with the fleet of devices. The method then comprises computing one or more scaling factors for the particular parameter associated with the particular device and scaling the one or more of fuzzy rules defined for the one or more parameters in the fleet-based diagnostic model, based on the one or more scaling factors, to generate a personalized diagnostic model for the particular parameter associated with the particular device. The method finally comprises evaluating the personalized diagnostic model against the one or more trend shifts detected for the one or more parameters, to diagnose a fault associated with the particular device.

20 Claims, 6 Drawing Sheets

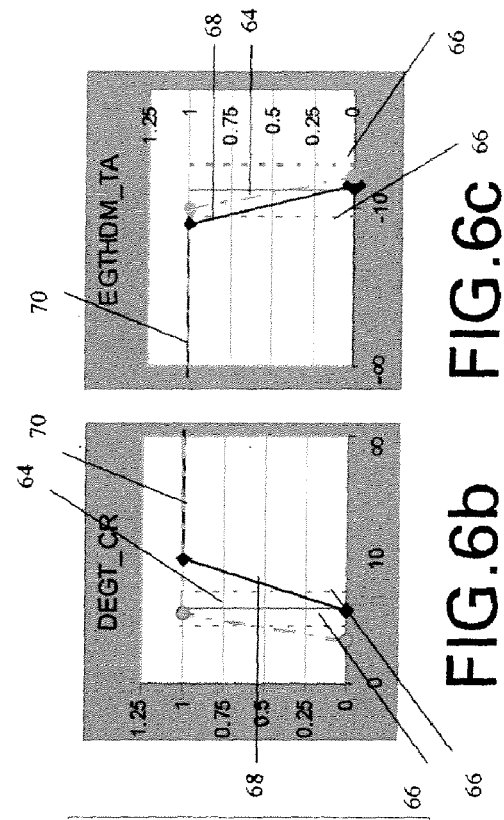
FIG. 6c    FIG. 6b
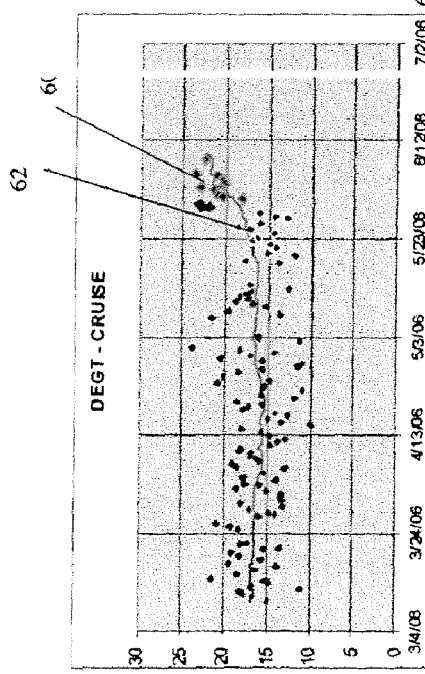
FIG. 6a
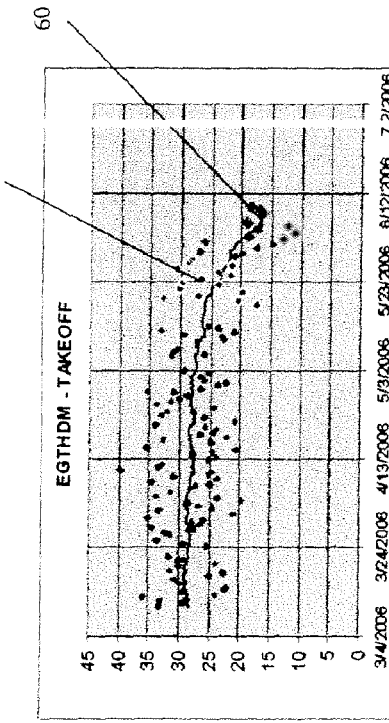
FIG. 6e
FIG. 6d

METHOD AND SYSTEM FOR DIAGNOSING FAULTS IN A PARTICULAR DEVICE WITHIN A FLEET OF DEVICES

BACKGROUND

The invention relates generally to automated diagnostic systems and methods and more particularly to a method and system for diagnosing faults in a particular device within a fleet of devices.

Diagnostic systems are generally developed based on analyzing data characteristics in fleets of equipment having similar behavioral patterns. Diagnostic systems may also use expert knowledge in the form of examples or validation cases in order to make accurate diagnoses. Validation cases typically include historical data of equipment parameter trend patterns captured and extracted by expert surveys and data mining techniques.

Diagnostic systems developed based on analyzing the data characteristics exhibited by fleets of equipment usually tend to provide accurate diagnosis for equipment whose behavioral pattern is close to the average behavioral pattern exhibited by the fleet. However, when individual equipment data characteristics vary substantially from the data characteristics exhibited by the fleet, "fleet-based diagnostic models" may provide inaccurate diagnosis, leading to the generation of false positives or false negatives. Further, "fleet-based diagnostic models" may fail to provide accurate diagnostic results when individual units within the same fleet have different signal to noise levels. In particular, for equipment with low noise levels, a "fleet-based diagnostic model" may fail to detect a fault that only causes subtle shifts below a threshold level, resulting in missed detections or false negatives. On the other hand, for equipment that normally operates above the typical noise level, a noisy signal may cause relatively large shifts that exceed rule thresholds, causing the "fleet-based diagnostic model" to generate a false diagnosis of a fault.

It would be desirable to develop a personalized diagnostic model based on individual engine data characteristics. In addition, it would be desirable to develop a personalized diagnostic model that automatically adapts to individual equipment data characteristics at various noise levels and improves model sensitivity and diagnostic accuracy.

BRIEF DESCRIPTION

In one embodiment, a method for diagnosing faults in a particular device within a fleet of devices is provided. The method comprises receiving performance data related to one or more parameters associated with a fleet of devices and processing the performance data to detect one or more trend shifts in the one or more parameters. The method then comprises detrending the one or more parameters to derive noise-adjusted performance data related to a particular parameter associated with a particular device. The method further comprises generating a fleet-based diagnostic model based on trend patterns and data characteristics associated with the fleet of devices. The fleet-based diagnostic model comprises one or more fuzzy rules defining one or more expected trend shift data ranges for the one or more parameters associated with the fleet of devices. The method then comprises computing one or more scaling factors for the particular parameter associated with the particular device and scaling the one or more of fuzzy rules defined for the one or more parameters in the fleet-based diagnostic model, based on the one or more scaling factors, to generate a personalized diagnostic model for the particular parameter associated with the particular device. The method finally comprises evaluating the personalized diagnostic model against the one or more trend shifts detected for the one or more parameters, to diagnose a fault associated with the particular device.

In a second embodiment, a system for diagnosing faults in a particular device within a fleet of devices is provided. The system comprises a trend shift detection component, a data detrending component, a fleet-based diagnostic model, a scaling component, a personalized diagnostic model component and a diagnosis component. The trend shift detection component is configured to receive performance data related to one or more parameters associated with a fleet of devices and process the performance data to detect one or more trend shifts in the one or more parameters. The data detrending component is configured to detrend the one or more parameters to derive noise-adjusted performance data related to a particular parameter associated with a particular device. The fleet-based diagnostic model is configured to generate trend patterns and data characteristics associated with the fleet of devices. The fleet-based diagnostic model comprises one or more fuzzy rules defining one or more expected trend shift data ranges for the one or more parameters associated with the fleet of devices. The scaling component is configured to compute one or more scaling factors for the particular parameter associated with the particular device. The personalized diagnostic model component is configured to scale the one or more of fuzzy rules defined for the one or more parameters in the fleet-based diagnostic model, based on the one or more scaling factors, to generate a personalized diagnostic model for the particular parameter associated with the particular device. The diagnosis component is configured to evaluate the personalized diagnostic model against the one or more trend shifts detected for the one or more parameters, to diagnose a fault associated with the particular device.

In a third embodiment, a method for diagnosing faults in a subset of devices is provided. The method comprises receiving performance data related to one or more parameters associated with a fleet of devices and processing the performance data to detect one or more trend shifts in the one or more parameters. The method then comprises detrending the one or more parameters to derive noise-adjusted performance data related to a particular parameter associated with a subset of devices. The subset of devices comprises devices in the fleet of devices having similar data characteristics and similar fault data. The method further comprises generating a fleet-based diagnostic model based on trend patterns and data characteristics associated with the fleet of devices. The fleet-based diagnostic model comprises one or more fuzzy rules defining one or more expected trend shift data ranges for the one or more parameters associated with the fleet of devices. The method then comprises computing one or more scaling factors for the particular parameter associated with the subset of devices and scaling the one or more of fuzzy rules defined for the one or more parameters in the fleet-based diagnostic model, based on the one or more scaling factors, to generate a personalized diagnostic model for the particular parameter associated with the subset of devices. The method finally comprises evaluating the personalized diagnostic model against the one or more trend shifts detected for the one or more parameters, to diagnose a fault associated with the subset of devices.

DRAWINGS

These and other features, aspects, and advantages of the present invention will become better understood when the following detailed description is read with reference to the accompanying drawings in which like characters represent like parts throughout the drawings, wherein.

FIGS. 6a-6d are exemplary data plots illustrating an application of the personalized diagnostic model for two parameters associated with a particular device, within a fleet of devices; and FIG. 6e is a plot comparing the data characteristics and diagnosis for two parameters using the personalized diagnostic model and the fleet-based diagnostic model, in accordance with one embodiment of the present invention.

DETAILED DESCRIPTION

Figure 1:
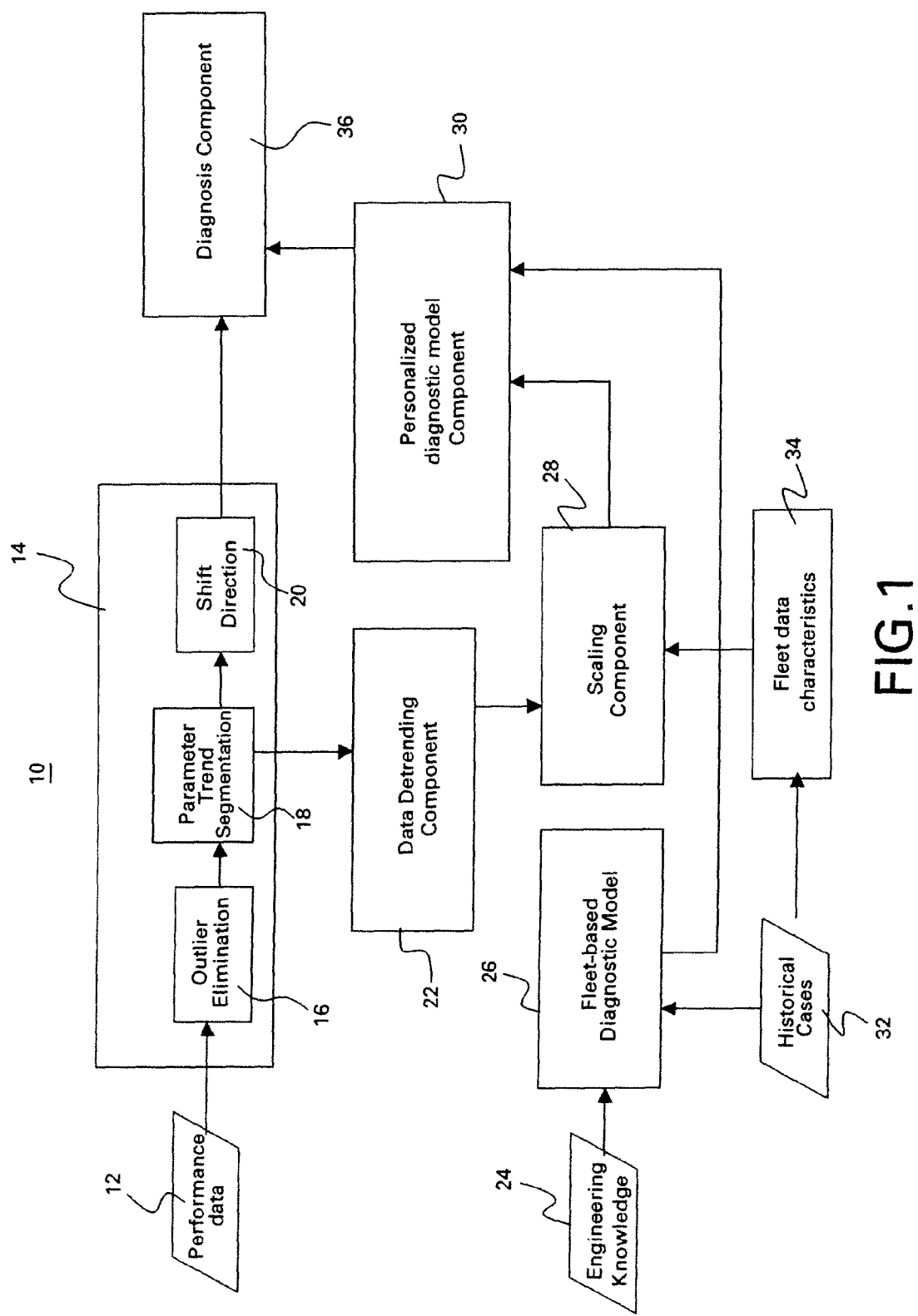
FIG. 1 is an illustration of an exemplary system for detecting faults in a particular device within a fleet of devices in accordance with one embodiment of the invention.

FIG. 1 is an illustration of an exemplary system for detecting faults in a particular device within a fleet of devices in accordance with one embodiment of the invention. As shown in FIG. 1, the system 10 includes a trend shift detection component 14, a data detrending component 22, a fleet-based diagnostic model 26, a scaling component 28, a personalized diagnostic model component 30 and a diagnosis component 36. In one embodiment, the fleet of devices includes aircraft engine systems. The diagnostic system and method disclosed in accordance with embodiments of the present invention, may however be used in conjunction with any mechanical system, electrical system, electro-mechanical system or biological system. Further the disclosed diagnostic system and method may also be used to detect faults in a "subset of devices" within a fleet of devices. As used herein, a "subset of devices" refers to one or more devices in the fleet of devices having similar data characteristics and similar fault data.

Referring to FIG. 1, the trend shift detection component 14 is configured to receive performance data 12 related to one or more parameters associated with the fleet of devices. In one embodiment, the parameters may include, but are not limited to, engine exhaust gas temperature, engine fuel flow and engine core speed. The performance data 12 related to the one or more parameters may be snapshots taken during various flight phases (such as, takeoff, cruise, etc) of the aircraft engine system, and may be preferably corrected to standard operating conditions, to reduce noise in the performance data. The performance data 12 may also include raw data not affected by environmental factors, for which data trends may be obtained without pre-processing, such as for example, vibration magnitude, raw oil pressure, oil temperature etc.

The trend shift detection component 14 is further configured to process the performance data to detect one or more trend shifts in the one or more parameters. As used herein, a "trend shift" refers to a particular shifting pattern exhibited by a parameter correlating to a possibility of a particular fault occurring in the fleet of devices. In one embodiment, the trend shift detection component 14 is configured to process the performance data by removing outlying data points 16 from the performance data. Outliers may be removed using standard statistical techniques known in the art. For example, outliers may be removed using standard deviation to determine if a data point falls outside of a pre-determined range of expected values.

Figure 2:
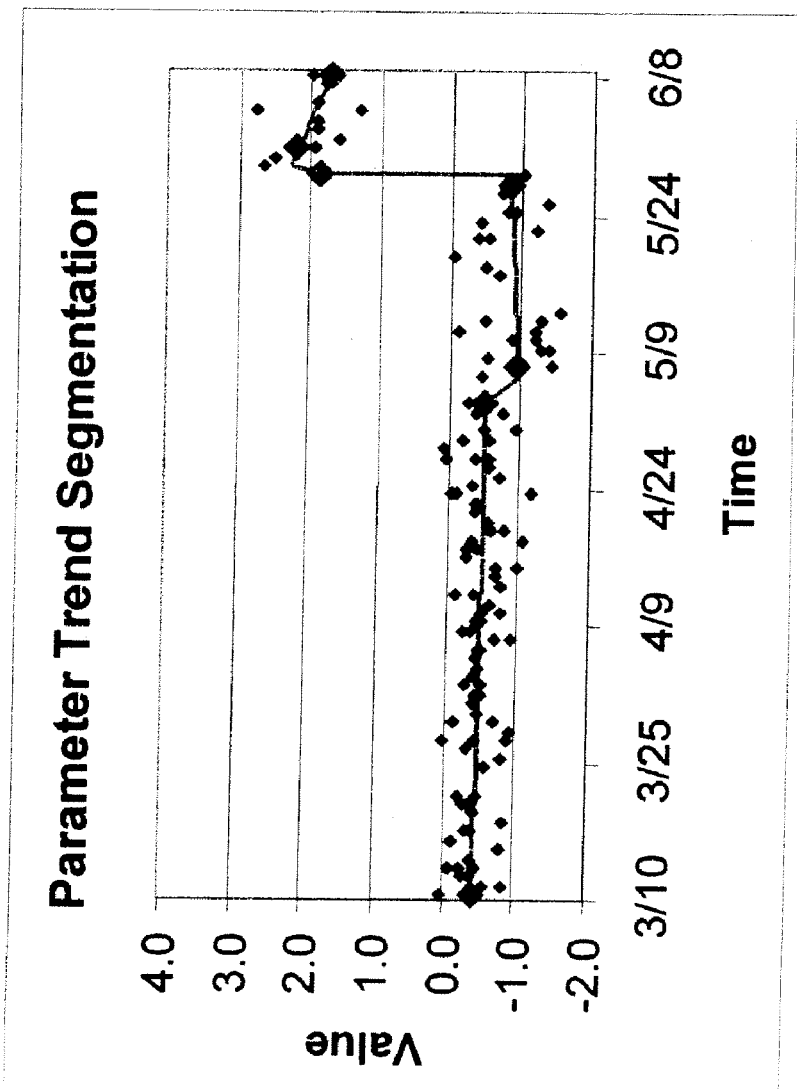
FIG. 2 is a graph illustrating a trend shift in one or more data segments of a parameter over time.

The trend shift detection component 14 is further configured to apply a set of piecewise regressions to detect one or more linear trends 18 in one or more data segments in the performance data. FIG. 2 is a graph illustrating a trend shift in one or more data segments of a parameter over time. In one embodiment, the performance data may be split by time in such a way as to allow linear or non-linear regressions to be run through each of a plurality of performance data segments with the lowest total residuals. The split points may then be evaluated to determine the most likely points that represent the beginning of a given problem. Data segments from the end of the performance data and around the best split point(s) may then be chosen such that each data segment includes as many data points as possible without a standard deviation too far above that of the standard deviation of the linear regression residuals of the entire data analysis window. The shifts for each data segment for a parameter, from an analysis start date may then be evaluated and combined across multiple variables using a threshold weighting mechanism, and the latest most significant weighted shift exhibited by the parameter (if it exists) may be extracted for fault isolation. The technique of using piecewise regressions to identify data segments having multiple linear trends and the technique of evaluating possible start dates to determine a start date with the most recent significant shift is described in greater detail in related U.S. Pat. No. 7,031,878 B2, entitled "Systems and methods for diagnosing the cause of trend shifts in performance data", the subject matter of which is incorporated by reference herein in its entirety.

Figure 3:
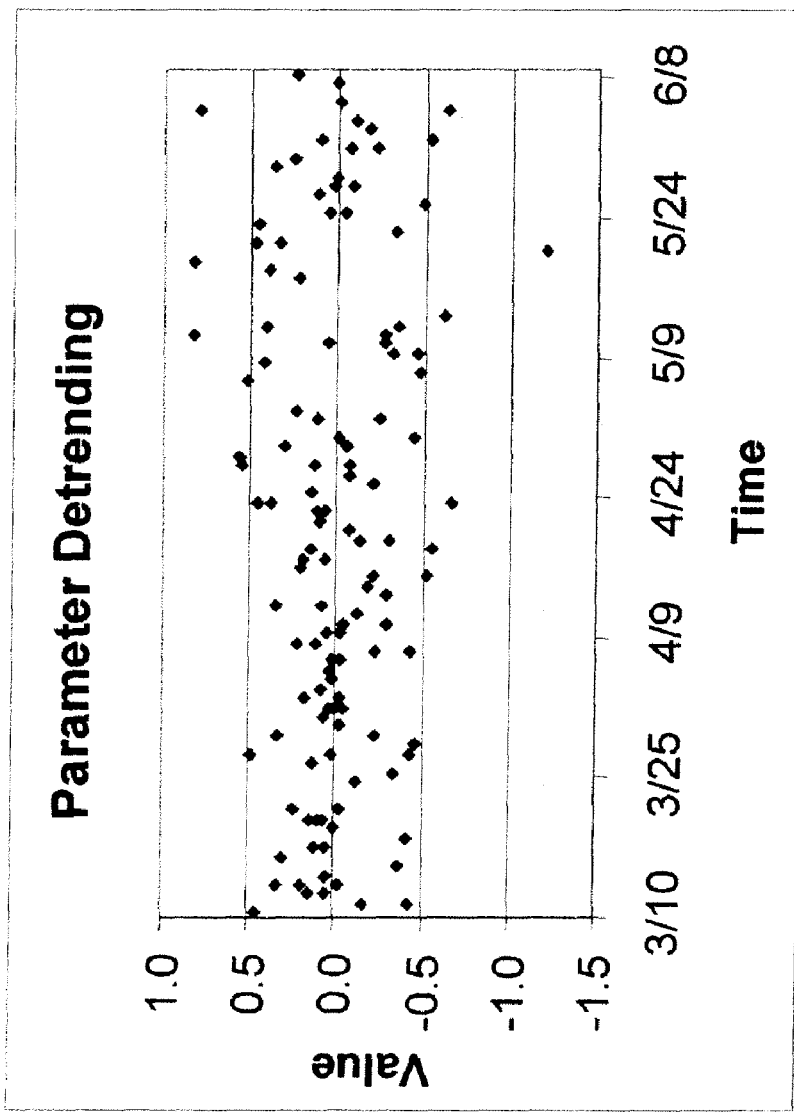
FIG. 3 is a graph illustrating detrended data in a parameter associated with a particular device, within the fleet of devices.

Referring to FIG. 1, the data detrending component 22 is configured to detrend the one or more parameters to derive noise-adjusted performance data related to a particular parameter associated with a particular device. As used herein, "noise-adjusted performance data" refers to the evaluation of the noise level for each parameter, based on individual operating conditions associated with the particular device. In one embodiment, the data detrending component 22 filters the one or more trend shifts caused by special events and normal deterioration associated with the particular device in the performance data related to a parameter. In a particular embodiment, the data detrending component 22 is configured to "subtract" the linear trend in the parameter data segments from the original parameter data segments, to obtain "detrended data" related to a parameter. FIG. 3 is a graph illustrating detrended data in a parameter associated with a particular device, within the fleet of devices. As may be observed from the graph shown in FIG. 3, variations in the detrended data represent normal variations or modeling errors resulting from un-modeled or physically inadmissible factors.

The fleet-based diagnostic model 26 is configured to generate trend patterns and data characteristics associated with the fleet of devices. Referring to FIG. 1, the fleet-based diagnostic model 26 uses a set of historical cases 32 and engineering knowledge 24 to extract historical data of engine fault assessments and common signatures of engine parameter trend patterns (derived from experts and data mining techniques). The analysis of fleet data by the fleet-based diagnostic model 26 may be performed offline, using model-learning techniques, to extract common fault signatures for devices in the fleet of devices with a similar fault, based on fleet feature similarity.

In one embodiment, the fleet-based diagnostic model 26 includes one or more fuzzy rules defining one or more expected trend shift data ranges for the one or more parameters associated with the fleet of devices. The fuzzy rules may be used to diagnose faults, based upon the expected trend shift data range defined for a parameter. To diagnose faults, the trend shift measured for a parameter must match the expected trend shift data range defined for the parameter, by its fuzzy rule.

In a particular embodiment, the fuzzy rules may be represented by one or more fuzzy membership functions. In a particular implementation, the fuzzy membership functions may be represented by a trapezoid, where the area defined by the trapezoid represents the one or more expected trend shift data ranges defined by the fuzzy rules for the one or more parameters. In other words, each fuzzy membership function evaluates the degree to which the mean shift for a parameter being measured falls within the expected trend shift data range defined for the parameter by the one or more fuzzy rules. Examples and implementation of fuzzy rules and fuzzy functions are disclosed in greater detail in related U.S. Pat. No. 7,031,878 B2, entitled "Systems and methods for diagnosing the cause of trend shifts in performance data," the subject matter of which is incorporated by reference herein in its entirety.

Based on noise-adjusted performance data derived by the data detrending component 22, the scaling component 28 is configured to compute one or more scaling factors for the particular parameter associated with the particular device. In one embodiment, the scaling factor is computed as a ratio of the standard deviation of the one or more de-trended parameters associated with the particular device, and a fleet average. Referring to FIG. 1, the fleet average may be derived, for example, based on one or more fleet data characteristics 34 associated with the fleet of devices. The fleet-based characteristics may represent common data characteristics exhibited by all devices in the same fleet with the same fault and may be extracted from the set of historical cases 32.

In a particular embodiment, the scaling factor for a particular parameter associated with a particular device may be represented by equation (1) as shown below:

$$SF_i = \frac{\sqrt{\frac{\sum_{j=1}^{n}(x_{ij}-\bar{x}_i)^2}{n-1}}}{\sum_{k=1}^{M}\left[\sqrt{\frac{\sum_{j=1}^{n_k}(x_{ijk}-\bar{x}_{ik})^2}{n_k-1}}\right]} \quad (1)$$

$$i = 1, 2, \ldots N$$

where, $i=1, 2, \ldots N$ refers to a particular parameter, N is the total number of parameters, M is the number of devices in the same fleet, n represents the number of data points captured for each parameter within an analysis window, and data series x refers to the detrended parameters. Therefore in equation (1), the numerator is the standard deviation of the detrended data series, and the denominator is the fleet average of the standard deviation of the detrended data series.

The scaling factors derived for a particular parameter may also be derived based on one or more parameter threshold values. In one embodiment, the threshold value represents a detection sensitivity target, and also serves as a normalization weight factor to normalize the trend shift among the different parameters.

In one embodiment, a threshold value for a parameter may be represented by equation (2) as shown below:

$$SF_i = \frac{\sqrt{\frac{\sum_{j=1}^{n}(x_{ij}-\bar{x}_i)^2}{n-1}}}{\alpha T_i} \quad (2)$$

where, $i=1, 2, \ldots N$ refers to a particular parameter, $T_i$ is the threshold value, n represents the number of data points captured for each parameter within an analysis window, data series x refers to the detrended parameters, and $\alpha$ is a scaling coefficient, typically chosen based on the fleet average signal to noise ratio. The numerator in equation (2) is the standard deviation of the detrended data series.

In another embodiment, the scaling factors may also be derived for a subset of devices within the fleet. As mentioned above, a subset of devices refers to one or more devices in the fleet of devices having similar data characteristics and similar fault data. The scaling factors derived for a subset of devices reduces the operational complexity from maintaining multiple sets of scaling factors for each individual device by maintaining a single set of scaling factors for each subset of devices. Referring to equations (1) and (2), the scaling factors for a subset of devices may be derived by replacing the numerator in equations (1) and (2) from a standard deviation of an individual device to the average of the fleet subset.

The scaling factors derived for a parameter associated with a particular device, or a subset of devices, as described above, enables the detection of individual device operating conditions or noise levels in order to achieve an optimized balance of high fault detection capability and lower false alert level, as will be described in greater detail below. Further, the scaling factors may be used to fine tune one or more fault signatures for individual devices either off-line or on-line depending on the specific implementation.

The personalized diagnostic model component 30 is configured to scale the one or more fuzzy rules defined for the one or more parameters in the fleet-based diagnostic model 26, based on the one or more scaling factors, to generate a personalized diagnostic model for the particular parameter associated with the particular device. In one embodiment, the personalized diagnostic model component 30 is configured to generate the personalized diagnostic model by shifting the one or more expected trend shift data ranges defined for the parameter, based on the scaling factors.

Equation (3) is an example of a fuzzy rule for a parameter, scaled by a scaling factor:

$$\hat{y}_{iml} = SF_i \cdot y_{iml}, \; m1, 2, 3, 4; \; l=1, 2, \ldots L \quad (3)$$

where, $y_{iml}$ represents the expected trend shift data range for a parameter i at each of the four corner points in the original fuzzy membership function for a fuzzy rule l, L is the total number of fuzzy rules captured by the fleet-based diagnostic model 26, and $SF_i$ represents the scaling factor derived for parameter i.

Figure 4:
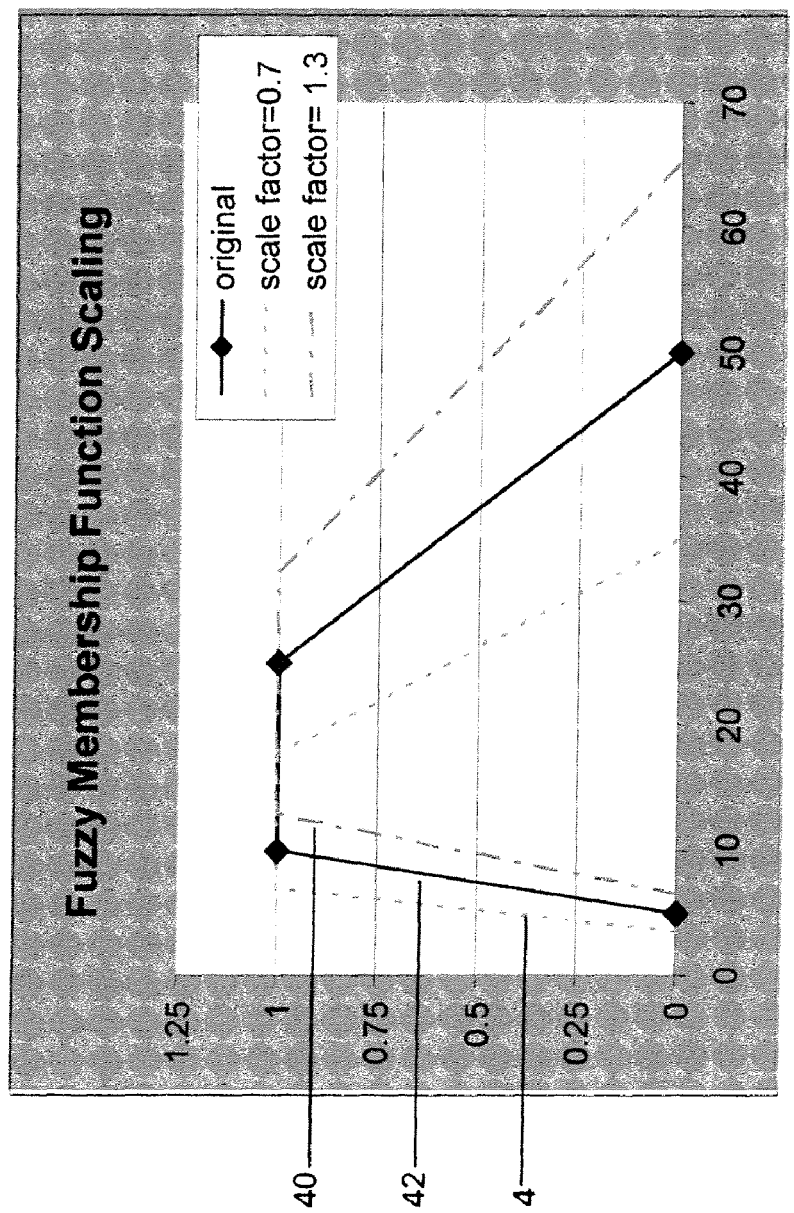
FIG. 4 is a graph illustrating the original and scaled fuzzy membership functions derived for a particular parameter with different scale factors.

FIG. 4 is a graph illustrating the original and scaled fuzzy membership functions derived for a particular parameter with different scale factors. As shown in FIG. 4, and in one embodiment, the fuzzy membership function is represented by a trapezoid, where the area defined by the trapezoid represents one or more expected trend shift data ranges defined by one or more fuzzy rules for the parameters. As mentioned above, the fuzzy membership function evaluates the degree to which the mean shift for a parameter being measured falls within the expected trend shift data range defined for the parameter by the fuzzy rules. Referring to FIG. 4, reference numeral 42 represents the original fuzzy membership function as derived by the fleet-based diagnostic model 26. Reference numeral 40 represents the increased expected shift derived for the particular parameter by the personalized diagnostic model component 30 when the scaling factor is greater than 1.0 and reference numeral 44 represents a reduced expected shift derived for the particular parameter when the scaling factor is less than 1.0. Accordingly, the personalized diagnostic model component 30 adjusts the fuzzy rules for a parameter based on the scaling factors derived for the parameter, for the particular device being analyzed. In other words, if the noise level for a particular parameter associated with the analyzed device, as indicated by the detrended data for the parameter, is less than noise level associated with the particular parameter associated with the fleet of devices, the expected trend shift for the parameter in the fuzzy rule is reduced so that more subtle shifts in the data becomes detectable. If, on the other hand, the noise level for a particular parameter for the analyzed device is greater than the noise level associated with the parameter in the fleet of devices, a larger shift is required to trigger the fuzzy rule so as to reduce the sensitivity of the personalized diagnostic model to the noise in the data.

The diagnosis component 36 may be configured to evaluate the personalized diagnostic model against the one or more trend shifts detected for the one or more parameters, to diagnose a fault associated with the particular device. In one embodiment, one or more mean shifts 20 (shown in FIG. 1) between a plurality of data samples, related to a parameter are measured using one or more statistical tests, such as, two sample t-tests and combined with the results derived from the personalized diagnostic model component 30 to diagnose a fault associated with the particular device. In a particular embodiment, a diagnosis evaluation may be performed using a fuzzy-T integration process. Implementation of the fuzzy-T integration process is disclosed in greater detail in related U.S. Pat. No. 7,031,878 B2, entitled "Systems and methods for diagnosing the cause of trend shifts in performance data," the subject matter of which is incorporated by reference herein in its entirety.

Figure 5:
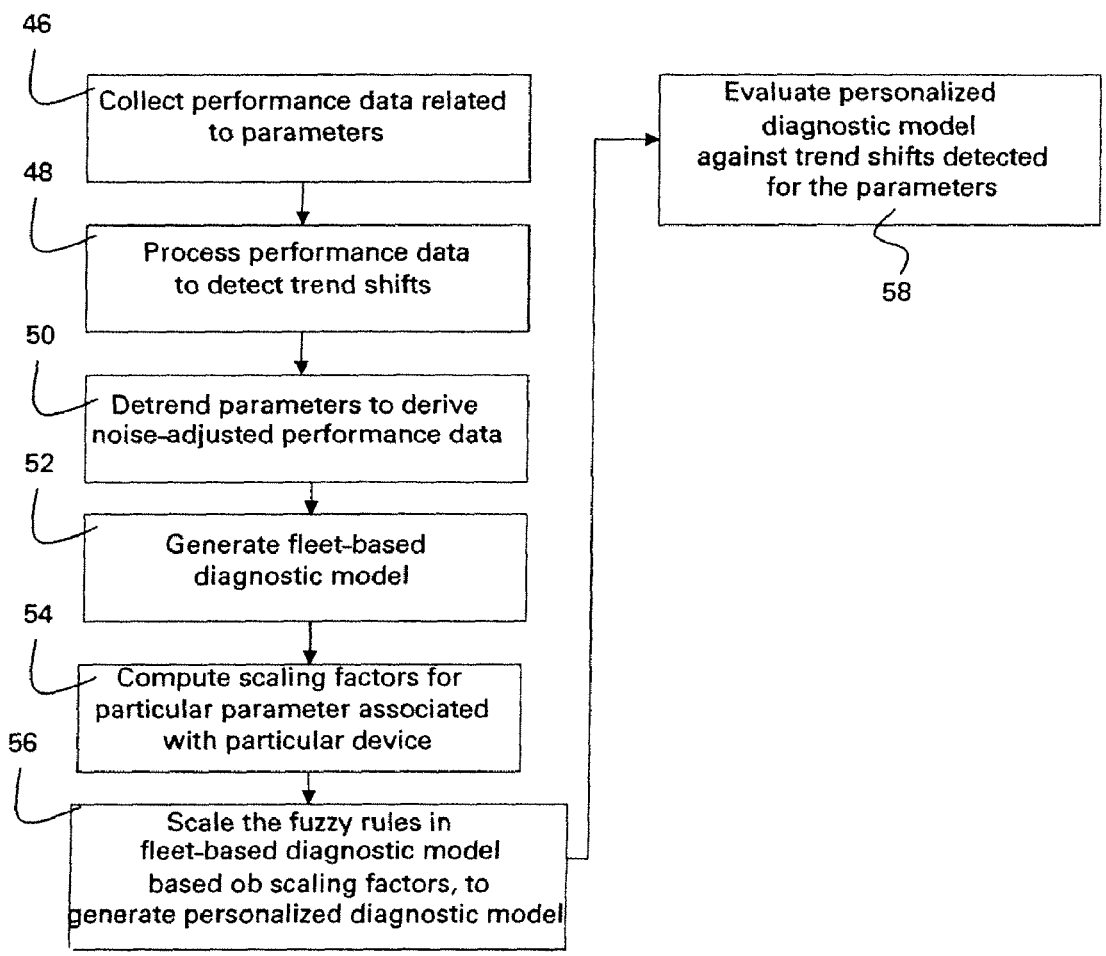
FIG. 5 illustrates exemplary process steps for diagnosing faults in a particular device within a fleet of devices in accordance with one embodiment of the invention.

FIG. 5 illustrates exemplary process steps for diagnosing faults in a particular device within a fleet of devices in accordance with one embodiment of the invention. In step 46, performance data related to one or more parameters associated with a fleet of devices is received. In a particular embodiment, the devices comprise aircraft engines. The one or more parameters may comprise engine exhaust gas temperature, engine fuel flow and engine core speed.

In step 48, the performance data is processed to detect one or more trend shifts in the one or more parameters. As mentioned above, processing the performance data comprises removing outlying data points from the performance data. The performance data may further be processed to detect one or more linear trends in one or more data segments in the performance data using a piecewise regression technique as described above.

In step 50, the one or more parameters are detrended to derive noise-adjusted performance data related to a particular parameter associated with a particular device. As mentioned above, de-trending the one or more parameters comprises filtering the one or more trend shifts caused by special events and normal deterioration associated with the particular device.

In step 52, a fleet-based diagnostic model is generated based on trend patterns and data characteristics associated with the fleet of devices. The fleet-based diagnostic model comprises one or more fuzzy rules defining one or more expected trend shift data ranges for the one or more parameters associated with the fleet of devices. As mentioned above, the fuzzy rules defined for the parameters are represented by one or more fuzzy membership functions. The fuzzy membership functions may be represented by a trapezoid, where the area defined by the trapezoid represents the one or more expected trend shift data ranges defined by the fuzzy rules for the one or more parameters.

In step 54, one or more scaling factors for the particular parameter associated with the particular device is computed. As mentioned above, the one or more scaling factors is calculated as a ratio of the standard deviation of the one or more de-trended parameters associated with the particular device, and a fleet average. The fleet average may be derived based on one or more fleet characteristics associated with the fleet of devices. The scaling factors may further be normalized based on one or more parameter threshold values.

In step 56, the one or more fuzzy rules defined for the one or more parameters in the fleet-based diagnostic model is scaled based on the one or more scaling factors, to generate a personalized diagnostic model for the particular parameter associated with the particular device. In one embodiment, and as described above, scaling the fuzzy rules further comprises shifting the one or more expected trend shift data ranges, for the parameter, based on the scaling factors.

In step 58, the personalized diagnostic model is evaluated against the one or more trend shifts detected for the one or more parameters, to diagnose a fault associated with the particular device. In a particular embodiment, and as mentioned above, a diagnosis evaluation may be performed using a fuzzy-T integration process.

FIGS. 6a-6d are exemplary data plots illustrating an application of the personalized diagnostic model for two parameters associated with a particular device, in a fleet of devices. FIG. 6a is an exemplary data plot of performance data for a delta Exhaust Gas Temperature (DEGT) parameter collected over an analysis window, with respect to flight cruise time. FIG. 6b is an exemplary data plot of performance data for an Exhaust Gas Temperature Hot Day Margin (EGTHDM) parameter collected over an analysis window with respect to flight takeoff time. Reference numerals 60 and 62 in FIGS. 6a and 6b represent the data distribution for the DEGT and EGTHDM parameters before and after an event (such as for example, an EGT indication system malfunction) occurs respectively, and these data sets are used to estimate the confidence band for the amount of trend shift exhibited by the two parameters, as indicated by the mean shift 64 and the confidence band of the shift 66 in the data plots shown in FIGS. 6c and 6d. Also shown in the data plots of FIGS. 6c and 6d, is the original fleet membership function 68 and the noise adjusted personalized membership function (or scaled fuzzy membership function) 70 for the two parameters, DEGT and EGTHDM with EGT system malfunction indication signatures.

FIG. 6e is a plot comparing the data characteristics and diagnosis for two parameters using the personalized diagnostic model and the fleet-based diagnostic model, in accordance with one embodiment of the present invention. Referring to the data plot shown in FIGS. 6c and 6d, the mean shift for the DEGT and EGTHDM parameters are 6.06 and −7.55 degrees, respectively which is well below the required shift in the corresponding fleet-based rule, and the matching scores for the two parameters are only 0.11 and 0.25 respectively in a zero to one scale. However, a comparison of the data scattering level of the particular device being analyzed with the fleet average indicates that the particular device being analyzed has lower data noise, resulting in a scaling factor of less than 1.0 for the parameters. As may be observed from the plot shown in FIG. 6e, using the personalized diagnostic model, the matching scores for the two parameters increase to 0.96 and 0.60 respectively, which significantly improves fault detection sensitivity.

The foregoing embodiments show the functionality and operation of the diagnostic system and method to diagnose faults in a particular device within a fleet of devices. In this regard, each block represents a module, segment, or portion of code, which comprises one or more executable instructions for implementing the specified logical function(s). It should also be noted that in some alternative implementations, the functions noted in the blocks may occur out of the order noted in the figures or, for example, may in fact be executed substantially concurrently or in the reverse order, depending upon the functionality involved. Also, one of ordinary skill in the art will recognize that additional blocks may be added.

Furthermore, the functions can be implemented in programming languages such as C++ or JAVA and MATLAB; however, other languages can be used. The above-described diagnostic system and method comprises an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer readable medium may comprise paper or another suitable medium upon which the instructions are printed. For instance, the instructions can be electronically captured via optical scanning of the paper or other medium, and then compiled, interpreted or otherwise processed in a suitable manner if necessary, and then stored in a computer memory.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for diagnosing faults in a particular device within a fleet of devices, the method comprising:
   receiving performance data related to one or more parameters associated with a fleet of devices;
   processing the performance data to detect one or more trend shifts in the one or more parameters;
   detrending the one or more parameters to derive noise-adjusted performance data related to a particular parameter associated with a particular device;
   generating a fleet-based diagnostic model based on trend patterns and data characteristics associated with the fleet of devices, wherein the fleet-based diagnostic model comprises one or more fuzzy rules defining one or more expected trend shift data ranges for the one or more parameters associated with the fleet of devices;
   computing one or more scaling factors for the particular parameter associated with the particular device;
   scaling the one or more of fuzzy rules defined for the one or more parameters in the fleet-based diagnostic model, based on the one or more scaling factors, to generate a personalized diagnostic model for the particular parameter associated with the particular device; and
   evaluating the personalized diagnostic model against the one or more trend shifts detected for the one or more parameters, to diagnose a fault associated with the particular device.

2. The method of claim 1, wherein each of the devices comprise one of a mechanical system, an electrical system, an electro-mechanical system or a biological system.

3. The method of claim 1, wherein the devices comprise aircraft engine systems.

4. The method of claim 1, wherein the parameters comprise at least one of engine exhaust gas temperature, engine fuel flow and engine core speed.

5. The method of claim 1, wherein processing the performance data comprises removing outlying data points from the performance data.

6. The method of claim 1, wherein processing the performance data comprises applying a set of piecewise regressions to detect one or more linear trends in one or more data segments in the performance data.

7. The method of claim 1, wherein de-trending the one or more parameters comprises filtering the one or more trend shifts caused by special events and normal deterioration associated with the particular device.

8. The method of claim 1, wherein the one or more scaling factors is calculated as a ratio of the standard deviation of the one or more de-trended parameters associated with the particular device, and a fleet average, wherein the fleet average is derived based on one or more fleet characteristics associated with the fleet of devices.

9. The method of claim 1, further comprising normalizing the one or more scaling factors for the particular parameter, based on one or more parameter threshold values.

10. The method of claim 1, wherein the one or more fuzzy rules defined for the one or more parameters are represented by one or more fuzzy membership functions.

11. The method of claim 10, wherein the one or more fuzzy membership functions are represented by a trapezoid, and wherein the area defined by the trapezoid represents the one or more expected trend shift data ranges defined by the fuzzy rules for the one or more parameters.

12. The method of claim 11, wherein scaling the one or more fuzzy rules to generate the personalized diagnostic model for the particular parameter associated with the particular device comprises shifting the one or more expected trend shift data ranges, for the parameter, based on the scaling factors.

13. A system for diagnosing faults in a particular device within a fleet of devices, the system comprising:
   a trend shift detection component, configured to receive performance data related to one or more parameters associated with a fleet of devices and process the performance data to detect one or more trend shifts in the one or more parameters;
   a data detrending component configured to detrend the one or more parameters to derive noise-adjusted performance data related to a particular parameter associated with a particular device;

a fleet-based diagnostic model configured to generate trend patterns and data characteristics associated with the fleet of devices, wherein the fleet-based diagnostic model comprises one or more fuzzy rules defining one or more expected trend shift data ranges for the one or more parameters associated with the fleet of devices;

a scaling component configured to compute one or more scaling factors for the particular parameter associated with the particular device;

a personalized diagnostic model component configured to scale the one or more of fuzzy rules defined for the one or more parameters in the fleet-based diagnostic model, based on the one or more scaling factors, to generate a personalized diagnostic model for the particular parameter associated with the particular device; and a diagnosis component configured to evaluate the personalized diagnostic model against the one or more trend shifts detected for the one or more parameters, to diagnose a fault associated with the particular device.

14. The system of claim 13, wherein the devices comprise aircraft engine systems and wherein the parameters comprise at least one of engine exhaust gas temperature, engine fuel flow and engine core speed.

15. The system of claim 13, wherein the data detrending component is configured to filter the one or more trend shifts caused by special events and normal deterioration associated with the particular device.

16. The system of claim 13, wherein the scaling component is configured to compute the one or more scaling factors as a ratio of the standard deviation of the one or more de-trended parameters associated with the particular device, and a fleet average, wherein the fleet average is derived based on one or more fleet characteristics associated with the fleet of devices.

17. The system of claim 13, wherein the one or more fuzzy rules defined for the one or more parameters are represented by one or more fuzzy membership functions.

18. The system of claim 17, wherein the one or more fuzzy membership functions are represented by a trapezoid, and wherein the area defined by the trapezoid represents the one or more expected trend shift data ranges defined by the fuzzy rules for the one or more parameters.

19. The system of claim 18, wherein the personalized diagnostic model component is configured to generate the personalized diagnostic model by shifting the one or more expected trend shift data ranges, for the parameter, based on the scaling factors.

20. A method for diagnosing faults for a subset of devices in a fleet of devices, the method comprising:

receiving performance data related to one or more parameters associated with a fleet of devices;

processing the performance data to detect one or more trend shifts in the one or more parameters;

detrending the one or more parameters to derive noise-adjusted performance data related to a particular parameter associated with a subset of devices, wherein the subset of devices comprise devices in the fleet of devices having similar data characteristics and similar fault data;

generating a fleet-based diagnostic model based on trend patterns and data characteristics associated with the fleet of devices, wherein the fleet-based diagnostic model comprises one or more fuzzy rules defining one or more expected trend shift data ranges for the one or more parameters associated with the fleet of devices;

computing one or more scaling factors for the particular parameter associated with the subset of devices;

scaling the one or more of fuzzy rules defined for the one or more parameters in the fleet-based diagnostic model, based on the one or more scaling factors to generate a personalized diagnostic model for the particular parameter associated with the subset of devices; and evaluating the personalized diagnostic model against the one or more trend shifts detected for the one or more parameters, to diagnose a fault associated with the subset of devices.

\* \* \* \* \*

UNITED STATES PATENT AND TRADEMARK OFFICE
CERTIFICATE OF CORRECTION

PATENT NO. : 7,826,943 B2
APPLICATION NO. : 11/695350
DATED : November 2, 2010
INVENTOR(S) : Yu et al.

Page 1 of 1

It is certified that error appears in the above-identified patent and that said Letters Patent is hereby corrected as shown below:

On the Face Page, in Field (75), under "Inventors", in Column 1, Line 3, delete "Osborne," and insert -- Osborn, --, therefor.

In Fig. 4, Sheet 4 of 6, delete Tag "4" and insert Tag -- 44 --, therefor.

In Fig. 5, Sheet 5 of 6, for Tag "56", in Line 3, delete "ob" and insert -- on --, therefor.

In Fig. 6a, Sheet 6 of 6, delete " " and insert -- --, therefor.

In Column 6, Line 52, in Equation (3), delete "m1," and insert -- m= 1, --, therefor.

Signed and Sealed this
Twenty-second Day of March, 2011

David J. Kappos
*Director of the United States Patent and Trademark Office*